United States Patent [19]

Buathier et al.

[11] 3,978,198
[45] Aug. 31, 1976

[54] METHOD FOR PRODUCING CARBON DISULFIDE

[75] Inventors: Bernard Buathier; André Combes, both of Lyon; Jean-Paul Jourdan, Ville D'Avray, all of France

[73] Assignee: Rhone-Poulenc Industries, Paris, France

[22] Filed: Apr. 8, 1975

[21] Appl. No.: 566,677

[30] Foreign Application Priority Data
Apr. 17, 1974 France .............................. 74.13973

[52] U.S. Cl. ............................ 423/443; 260/609 R; 423/563
[51] Int. Cl.² .................................... C01B 31/26
[58] Field of Search ........... 423/443, 439, 418, 561, 423/563, 444; 201/1 F; 260/609 R

[56] References Cited
UNITED STATES PATENTS

| 2,480,639 | 8/1949 | Ferguson | 423/444 |
| 2,789,037 | 4/1957 | Kimberlin | 423/444 |

OTHER PUBLICATIONS

Fuel Flue Gases, American Gas Association, New York, (1940), pp. 105–107.

*Primary Examiner*—L. Dewayne Rutledge
*Assistant Examiner*—Michael L. Lewis
*Attorney, Agent, or Firm*—Bacon & Thomas

[57] ABSTRACT

A method for producing carbon disulfide by sulfurization of sulfur-containing organic compounds is described. Conventional apparatus may be employed with realization of reactant conversion rates approaching 100%, and production of undesirable by-products is insignificant.

12 Claims, No Drawings

METHOD FOR PRODUCING CARBON DISULFIDE

BACKGROUND OF THE INVENTION

1. Field of the Invention

The present invention relates to a method for producing carbon disulfide by sulfurization of sulfur-containing organic compounds.

2. Description of the Prior Art

Numerous processes exist in the art for generating carbon disulfide which rely upon sulfur reactions with carbon-containing substances. Typical sources for carbon which have been employed include charcoal, coal, certain gaseous or liquid hydrocarbons, and the like. However, the available supplies of suitable hydrocarbon substances are becoming increasingly more expensive and are in great demand in other segments of industry, thus reducing ready availability as well as desirability. As a result of such considerations as the current energy crisis, manufacturers have been led to search for new methods to produce main chemical intermediates by investigating products unexploited heretofore in regards to various chemical processes. For example, work carried on in the facilities of the assignee of the present invention has resulted in the realization that methanol may be reacted with hydrogen sulfide to produce commercial quantities of methyl mercaptan and/or dimethylsulfide.

It has been determined in accordance with the present invention that these, and other, sulfur-containing organic compounds can be simply, efficiently, and economically converted to carbon disulfide.

SUMMARY OF THE INVENTION

Accordingly, it is the major object of the present invention to produce carbon disulfide in commercial quantities in a simple, yet highly efficient manner.

It is another object of the present invention to produce carbon disulfide in a one-step reaction whereby the need to first generate intermediate substances is obviated.

It is yet another object of the present invention to produce carbon disulfide by sulfurization of sulfur-containing organic compounds.

These and other objects and advantages of the present invention will become apparent to the skilled artisan upon examination of the following detailed description of the invention when taken in conjunction with the appended claims.

In accordance with the present invention, the aforementioned objects are accomplished by reacting sulfur and a sulfur-containing organic compound of the general formula $R-S_n-R'$, where $n$ is 1 or 2, R is a lower alkyl group having 1 to 4 carbon atoms and R' is selected from the group consisting essentially of hydrogen and lower alkyl groups having 1 to 4 carbon atoms. The reaction is advantageously conducted in the gaseous phase at a temperature within the range of from about 450°C to about 800°C for a time ranging from about 1 second to 1 minute. Conventional apparatus currently employed to produce carbon disulfide by sulfurization of gaseous hydrocarbons may be employed without the need to effect modification thereof. The process according to the present invention advantageously provides conversion rates of reactants approaching 100% with insignificant production of undesirable by-products, such as tars and the like.

DETAILED DESCRIPTION OF THE INVENTION

The production of commercial quantities of carbon disulfide may be achieved by direct sulfurization of sulfur-containing organic compounds. The organic compounds of interest may be represented by the general formula $R-S_n-R'$ where $n$ is 1 or 2, R is a lower alkyl group having 1 to 4 carbon atoms and R' is selected from the group consisting essentially of hydrogen and lower alkyl groups having a 1 to 4 carbon atoms. The reaction is conducted in the gaseous phase, in a reactor maintained at a temperature between about 450°C and about 800°C for a residence time of from about 1 second to about 1 minute. Preferably, methyl mercaptan and/or dimethyl sulfide are sulfurized.

In addition to the preferred reactants of methyl mercaptan and/or dimethyl sulfide, any sulfur-containing organic compound of the general formula $R-S_n-R'$ in which $n$ is 1 or 2, R is a lower alkyl group having 1 to 4 carbon atoms and R' is selected from the group consisting essentially of hydrogen and lower alkyl groups having 1 to 4 carbon atoms may be employed. Exemplary of such compounds are: mercaptans such as ethyl mercaptan, propyl and butyl mercaptans; dialkyl sulfides such as ethyl n-propyl sulfide, ethyl n-butyl sulfide, methyl n-propyl sulfide, methyl n-butyl sulfide, diethyl sulfide, di-n-propyl sulfide, di-n-butyl sulfide, methyl isopropyl sulfide, methyl sec-butyl sulfide, ethyl sec-butyl sulfide, propyl isopropyl sulfide, diisopropyl sulfide, di-sec-butyl sulfide, methyl tert-butyl sulfide, and preferably the methyl ethyl sulfide, diethyl sulfide, di-n-propyl sulfide and diisopropyl sulfide; homologs of the foregoing dialkyl disulfides; and mixtures thereof.

These reactants can be employed in either pure or technical form. For example, in the particular case of methyl mercaptan, either a purified or crude product resulting from reaction of hydrogen sulfide and methanol may suitably be employed. Dimethyl sulfide by-product incorporated in the methyl mercaptan will not hinder the efficiency of the instant process, it being sufficient to separate any aqueous component from the organic compound containing the methyl mercaptan and dimethyl sulfide, thence carrying out sulfurization of the mixture. The crude methyl mercaptan reactant may be obtained by reaction in a gaseous phase of hydrogen sulfide and methanol, as particularly described in pending United States patent application, Ser. No. 501,293, filed Aug. 28, 1974, now U.S. Pat. No. 3,935,276, assigned to the assignee of the present invention, and hereby incorporated by reference.

In combination with the foregoing process for the production of methyl mercaptan and/or dimethyl sulfide, additional economic advantages may be realized from the present invention. Briefly, methyl mercaptan is produced by gaseous reaction of hydrogen sulfide and methanol within the temperature range of from about 280° to about 450°C, at a pressure between 2.5 and 25 bars and in the presence of a catalyst including activated aluminum. The methyl mercaptan thus produced may then be employed in the present invention as the preferred reactant together with free sulfur, to yield the desired carbon disulfide. Additionally, the production of carbon disulfide according to the present invention yields hydrogen sulfide as a by-product which may be recycled to the reaction for producing the methyl mercaptan. Accordingly, a closed system is created whereby enhanced utilization of both reactants and by-products may be achieved. Similarly, the energy required to preheat incoming reactants for the production of carbon disulfide is minimized as the prior reaction yields methyl mercaptan at a somewhat elevated temperature.

Reaction parameters for the process according to the present invention may vary widely. The reaction temperature may vary over the range of from about 450°C to 800°C, preferably within the range of from about 550°C to 700°C. The lower operating limit is selected for most economical yields while the upper limit merely to reduce degradation of the operating equipment from such causes as, for example, corrosion. Reaction pressures may similarly vary widely, it having been determined that for most industrial applications, total pressures approaching 10 kg/cm$^2$ are most advantageous.

The sulfurization reaction of the present invention proceeds very rapidly with a residence time of from between 1 second and 1 minute typically being necessary to effect complete conversion. In practice, it has been determined that a preferred range, consonant with the preferred operating temperature, is between about 5 and about 30 seconds.

In order to obviate unwanted secondary reactions and undesirable by-products, the relative proportions of sulfur and the sulfur-containing organic compound are maintained near the stiochiometry of the reaction. However, it has been found advantageous to employ a stiochiometric excess of sulfur up to 30% calculated as free sulfur.

It has also been determined that the process of the present invention may be enhanced by additional feeds of hydrocarbon typically employed heretofore in the production of carbon disulfide.

In practicing the process of the present invention, it is desirable to conduct the reaction in the gaseous phase in a reactor fabricated from a corrosion resistant material such as, for example, refractory steel. The sulfur feed is preheated to a temperature approximately that selected for the overall reaction. The sulfur-containing organic reactant is preferably vaporized and fed continuously to the reactor. Upon reaction, at the outlet port of the reactor, gaseous effluent containing essentially sulfur, hydrogen sulfide and carbon disulfide is directed to a condenser wherein unreacted sulfur is condensed and thence recycled; the gases are freed from the last traces of sulfur, and the hydrogen sulfide and carbon disulfide separated in any of the typically employed processes therefor. Hydrogen sulfide generated in this reaction may be stored for subsequent use in the production of sulfur or sulfuric acid, or optionally recycled to the above-noted process for production of methyl mercaptan from methanol. If required or desirable, the carbon disulfide may be subjected to further purification.

In order to further illustrate the objects and advantages of the present invention, the following examples will be provided, the same intended as illustrative and in no wise limitative:

EXAMPLE 1

Sulfur and methyl mercaptan were continuously fed into a reactor, maintained at 550°C, at flow rates of 836 gm/hr and 397 gm/hr, respectively, which corresponds to a 5% excess of free sulfur. The reactants were preheated: sulfur was introduced at 550°C and methyl mercaptan at 240°C. The residence time in the reactor at 550°C was 5 seconds and the test was conducted for 30 hours. The following results were obtained:

| | |
|---|---|
| Conversion of methyl mercaptan | 99.5% |
| Selectivity of conversion to CS$_2$ | 98.0% |
| Selectivity of conversion to CH$_4$ | 2.0% |

EXAMPLE 2

The test of Example 1 was repeated, but residence time in the reactor increased to 10 seconds. The following results were obtained:

| | |
|---|---|
| Conversion of methyl mercaptan | 100.0% |
| Selectivity of conversion to CS$_2$ | 99.5% |
| Selectivity of conversion to CH$_4$ | 0.5% |

EXAMPLE 3

Sulfur and dimethyl sulfide were continuously fed into a reactor, maintained at 700°C, at flow rates of 895 gm/hr and 251 gm/hr, respectively, which corresponds to a 15% excess of free sulfur. The reactants were preheated: sulfur was introduced at 700°C and dimethyl sulfide at 200°C. The residence time in the reactor at 700°C was 5 seconds. The following results were obtained:

| | |
|---|---|
| Conversion of dimethyl sulfide | 100.0% |
| Selectivity of conversion to CS$_2$ | 93.5% |
| Selectivity of conversion to CH$_4$ | 5.5% |
| Selectivity of conversion to C$_2$H$_6$ | 1.0% |

EXAMPLE 4

The test of Example 3 was repeated, but residence time in the reactor increased to 10 seconds. The following results were obtained:

| | |
|---|---|
| Conversion of dimethyl sulfide | 100.0% |
| Selectivity of conversion to CS$_2$ | 98.5% |
| Selectivity of conversion to CH$_4$ | 1.5% |

EXAMPLE 5

Sulfur and dimethyl sulfide were continuously fed into a reactor, maintained at 600°C, at flow rates of 944 gm/hr and 504 gm/hr, respectively, which corresponds to a 10% excess of free sulfur. The reactants were preheated: sulfur was introduced at 600°C and dimethyl sulfide at 250°C. The residence time in the reactor at 600°C was 5 seconds. The following results were obtained:

| | |
|---|---|
| Conversion of dimethyl sulfide | 100% |
| Selectivity of conversion to CS$_2$ | 95% |
| Selectivity of conversion to CH$_4$ | 4% |
| Selectivity of conversion to C$_2$H$_6$ | 1% |

EXAMPLE 6

Methanol and hydrogen sulfide were reacted to yield a mixture of 94% methyl mercaptan and 6% dimethyl sulfide. This mixture was preheated to 240°C and continuously introduced to a reactor, maintained at 600°C, at a flow rate of 322 gm/hr. Simultaneously, sulfur was preheated to 600°C and introduced to the reactor at a flow rate of 836 gm/hr, which corresponds to a 10% excess of free sulfur. The residence time in the reactor at 600°C was 5 seconds. The following results were obtained:

| | |
|---|---|
| Conversion of methyl mercaptan/ dimethyl sulfide | 100% |
| Selectivity of conversion to $CS_2$ | 98% |
| Selectivity of conversion to $CH_4$ | 2% |

The foregoing examples and disclosures are set forth merely for illustrating the mode and manner of the present invention and, while various modifications and embodiments may be made by those skilled in the art, in the light of this invention, they are made without departing from the spirit thereof. It is intended, therefore, that the invention be limited only by the scope of the following claims.

What is claimed is:

1. The process of producing carbon disulfide, comprising the step of reacting sulfur, at elevated temperatures, with a reactant consisting essentially of one or more sulfur-containing organic compounds of the general formula $R—S_n—R'$; wherein $n$ is 1 or 2, R is a lower alkyl group having 1 to 4 carbon atoms and R' is selected from the group consisting essentially of hydrogen and lower alkyl groups having 1 to 4 carbon atoms.

2. The process of claim 1, wherein said reaction is conducted within the temperature range of from about 450°C to about 800°C.

3. The process of claim 1, wherein said reaction is conducted within the temperature range of from about 550°C to about 700°C.

4. The process of claim 1, wherein the residence time of said reaction is from about 1 second to about 1 minute.

5. The process of claim 1, wherein the residence time of said reaction is from about 5 seconds to about 30 seconds.

6. The process of claim 1, wherein said sulfur is present in stiochiometric excess.

7. The process of claim 6, wherein said excess is up to about 30% calculated as free sulfur.

8. The process of claim 1, wherein said sulfur and said sulfur-containing compound are reacted in the gaseous phase.

9. The process of claim 1, wherein said organic compound is selected from the group comprising methyl mercaptan and dimethyl sulfide.

10. In combination with the process of claim 9, the method of producing said reactant organic compound by reacting methanol with hydrogen sulfide.

11. The process of claim 9 wherein hydrogen sulfide is produced as a by-product of said reaction, and further comprising the step of reacting said hydrogen sulfide with methanol to produce said sulfur-containing organic compound.

12. The process of claim 1, further comprising reacting a hydrocarbon with said sulfur and said sulfur-containing organic compound.

* * * * *